United States Patent [19]

Yarnell

[11] Patent Number: 4,648,454
[45] Date of Patent: Mar. 10, 1987

[54] ROBOT

[76] Inventor: Ian R. Yarnell, Unit 106B, Blackdown Industries, Haste Hill, Haslemere, Surrey, GU27 2HA, England

[21] Appl. No.: 561,596

[22] PCT Filed: Mar. 29, 1983

[86] PCT No.: PCT/GB83/00094
§ 371 Date: Nov. 29, 1983
§ 102(e) Date: Nov. 29, 1983

[87] PCT Pub. No.: WO83/03457
PCT Pub. Date: Oct. 13, 1983

[30] Foreign Application Priority Data

Mar. 29, 1982 [GB] United Kingdom ............... 8209222
Nov. 2, 1982 [GB] United Kingdom ............... 8231303

[51] Int. Cl.$^4$ .............................................. E21B 29/06
[52] U.S. Cl. .................................. 166/297; 166/55.7; 409/143
[58] Field of Search ............ 166/55, 55.2, 55.6, 166/55.7, 55.8, 297; 175/26, 27, 230, 4.52; 409/143, 179

[56] References Cited

U.S. PATENT DOCUMENTS 2,942,092  6/1960  Cammann ..................... 166/298 X
3,507,340  4/1970  Voetter ............................ 175/4.52
4,197,908  9/1980  Davis et al. ................... 409/143 X
4,442,891  4/1984  Wood ........................... 166/55.8 X Primary Examiner—Stephen J. Novosad
Assistant Examiner—William P. Neuder
Attorney, Agent, or Firm—John J. Byrne; Bradford E. Kile

[57] ABSTRACT

A remotely controllable travelling robot for operation inside a pipe or bore-hole has a tool mounting assembly (22) which is rotatable in support structure (14, 16) about a longitudinal axis. The support structure (14, 16) is mounted on a pair of skids (10, 12) by means of a hydraulically driven elevator mechanism including rams (32) mounted on the skids 10, 12 which lift the support structure (14, 16) to a required height so as to place the longitudinal axis approximately in coincidence with the axis of the pipe or bore-hole. A tool mounting head (80) forming part of the tool mounting assembly (22) is itself hydraulically powered for tilting about a transverse axis and for moving transversely relative to the longitudinal axis along a transverse bar (88) fixed in a tool mounting assembly casing 60.

8 Claims, 12 Drawing Figures

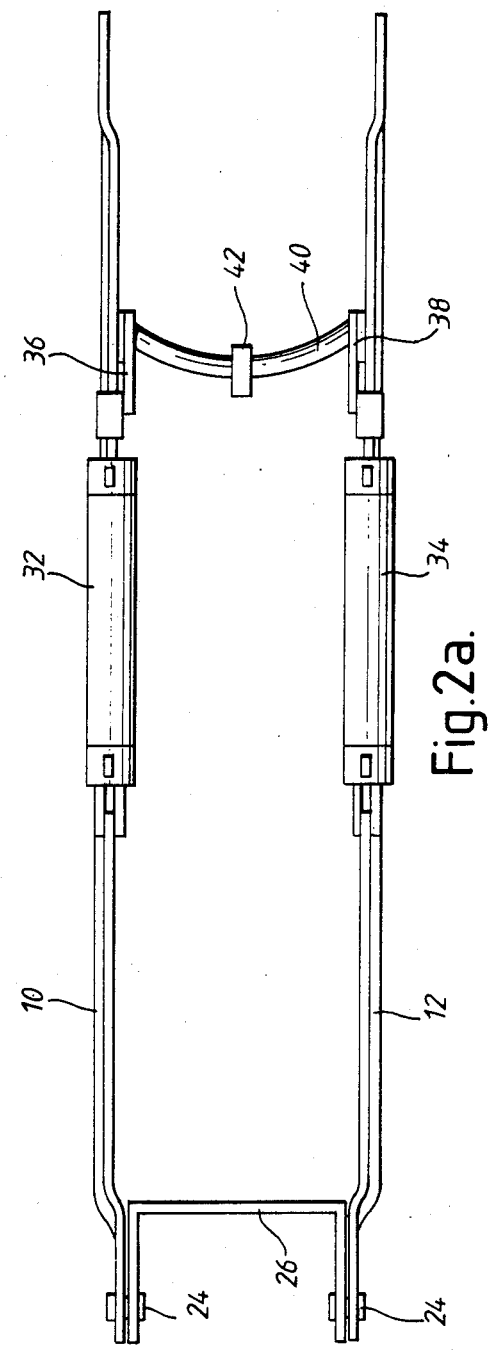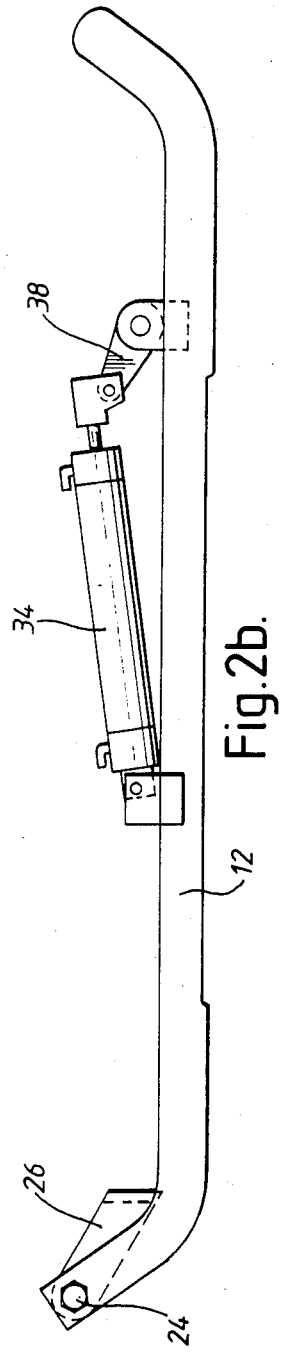

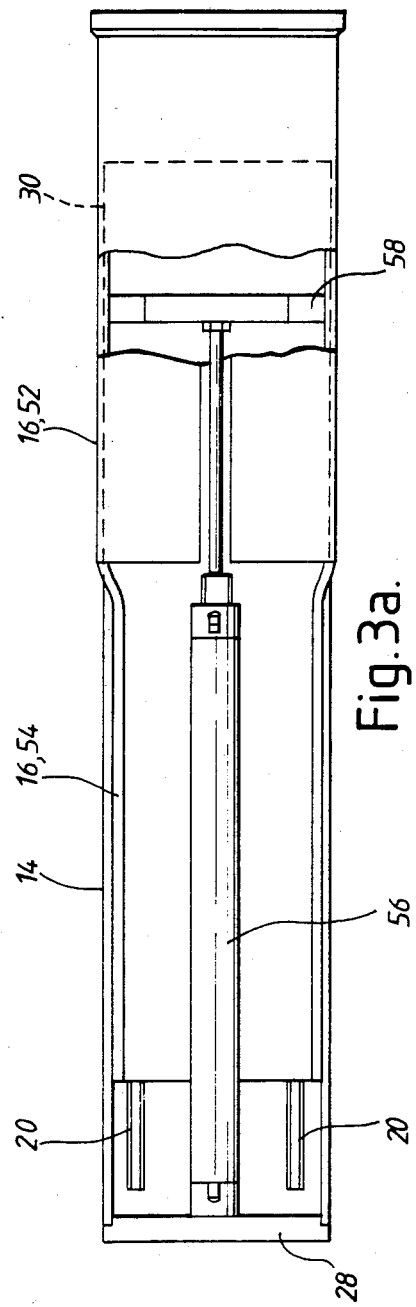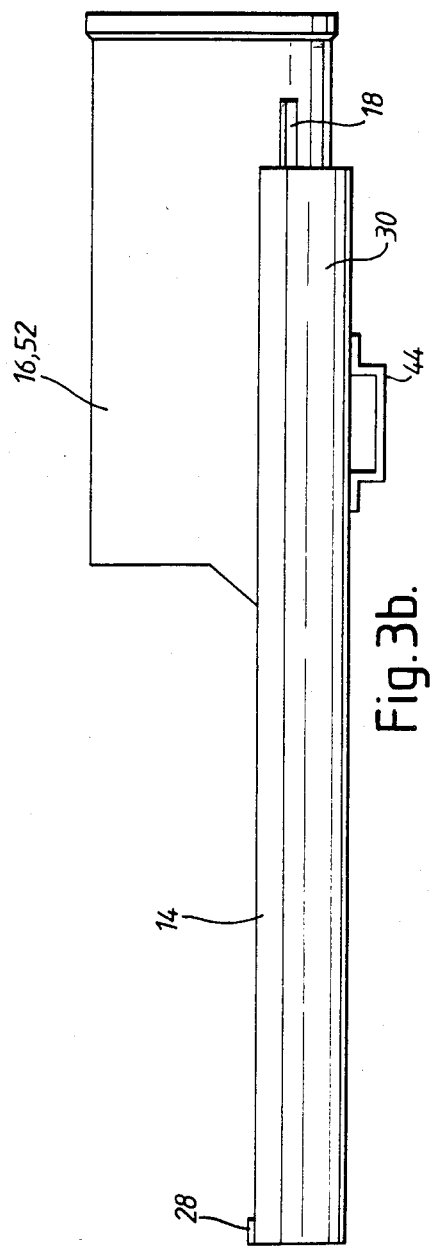

ROBOT

This invention relates to a robot for operation inside a pipe or bore-hole, and to a method of cutting an aperture in the wall of the pipe. The invention is primarily applicable to the renovation of sewers and the accurate cutting of apertures for service inlets in an internal repair pipe or lining fitted inside an existing sewer pipe.

The age of a large proportion of drainage sewers in the established industrial countries is such that leaks and collapses are becoming increasingly common, to the extent that there is a need for improved techniques whereby existing underground sewers can be renovated quickly, effectively, and with the minimum amount of excavation work. Known renovation techniques include lining an existing earthenware sewer pipe with a plastics, generally polyethylene, inner pipe which is slid into the existing pipe section by section from an excavated shaft until the inner pipe emerges at another excavated shaft which may be several hundred meters distant. This is known as slip lining. In a second known method, a flexible plastics tube with an open end and a closed end is fitted at its open end to the open end of the existing pipe, and the closed end of the flexible pipe is then passed through the open end so that the flexible pipe is effectively folded inside out. The closed end is pushed along the sewer by water pressure until it has reached its maximum extent, and then the material of the inner pipe is cured or hardened by pumping hot water into the pipe to yield a hard plastics lining moulded to the interior wall of the original sewer pipe. This is known as 'in-situ' lining.

A problem with both techniques arises at service pipe locations where an apperture has to be cut in the lining pipe at each service inlet so that each inlet is connected to the interior of the renovated sewer. Known methods of cutting the wall of the lining from inside the lining using currently available remotely controlled machines or robots tend to result in inlet apertures which do not correspond accurately in position or shape to the inlet pipe, and which have rough edges with unwanted projections liable to impair drainage efficiency. In addition, the known machines are not readily adaptable to different pipe sizes or to irregularities in the shape and position of service inlet openings.

According to this invention there is provided a remotely controllable travelling robot for operation inside a pipe or bore-hole, comprising: a carriage for engaging the wall of the pipe or bore-hole, a support structure mounted on the carriage, and a tool mounting assembly carried by the support structure and rotatable relative to the support structure by remote control about a longitudinal axis, wherein the support structure is movable by remote control relative to the carriage to vary the position of the said longitudinal axis of rotation relative to the carriage.

The dimensions of the robot are such that it can be drawn through, for example, a sewer pipe which has been lined in one of the methods described above. Preferably, the tool mounting assembly includes a tool mounting head and drive means, the drive means being remotely controllable for pivoting the tool mounting head about a transverse axis.

For cutting an aperture in a pipe lining at a branch pipe location, a compressed air driven motor is mounted on the tool mounting head and fitted with a cutting tool having cutting surfaces directed laterally away from the motor axis so that once the lining has been punctured, the robot can be used to inch the drill around the circumference of the branch pipe opening, cutting away the lining material in registry with the edge of the branch pipe opening, using the branch pipe interior surface as a template. A preferred cutting tool in accordance with the invention has a smooth enlarged distal end portion to minimise damage to the branch pipe interior surface.

Lateral movements of the tool in the aperture are controlled by rotation of the tool housing assembly in the support structure, whilst longitudinal movements, i.e. longitudinally of the lined pipe, are controlled by 'nodding' the tool mounting head, or, in the preferred embodiment, by linearly moving the tool mounting assembly relative to the carriage. Cutting a circular or elliptical aperture at a branch pipe opening involves a combination of these lateral and longitudinal movements.

The ability to shift the longitudinal axis of rotation of the tool mounting assembly by remote control allows the operator to bring the longitudinal axis into coincidence with the axis of the lined pipe over a wide range of pipe sizes. This also has advantages for reducing the height of the machine when passing through sections of restricted diameter, or where a branch pipe meets the lined pipe non-radially. In general, the flexibility of movement offered by a robot in accordance with the invention gives the operator better control over the cutting operation than possible with prior art machines, resulting in more accurately cut and more quickly produced lateral pipe connections. The flexibility of movement also allows use of the robot in a variety of other applications such as further cutting operations, grouting operations, and cable laying.

In the preferred embodiment, all movements of the cutting tool are executed by a plurality of hydraulic or pneumatic rams, driven via a plurality of supply pipes leading from a remote control location. Use of pressurised rams in preference to electric motors or other electrical devices minimises the effects of water on the operation of the carrier. In its preferred form the carrier is capabe of operating when completely immersed in water.

The invention will now be described by way of example with reference to the drawings in which:

FIGS. 2a and 2b are a plan view and a side view respectively of a pair of skids and an elevator mechanism forming part of the robot of FIG. 1;

FIGS. 3a and 3b are a plan view and a side view respectively of a tray supporting a longitudinally movable sleeve member, the tray being shaped for mounting on the skids of FIGS. 2a and 2b;

Figure 1:
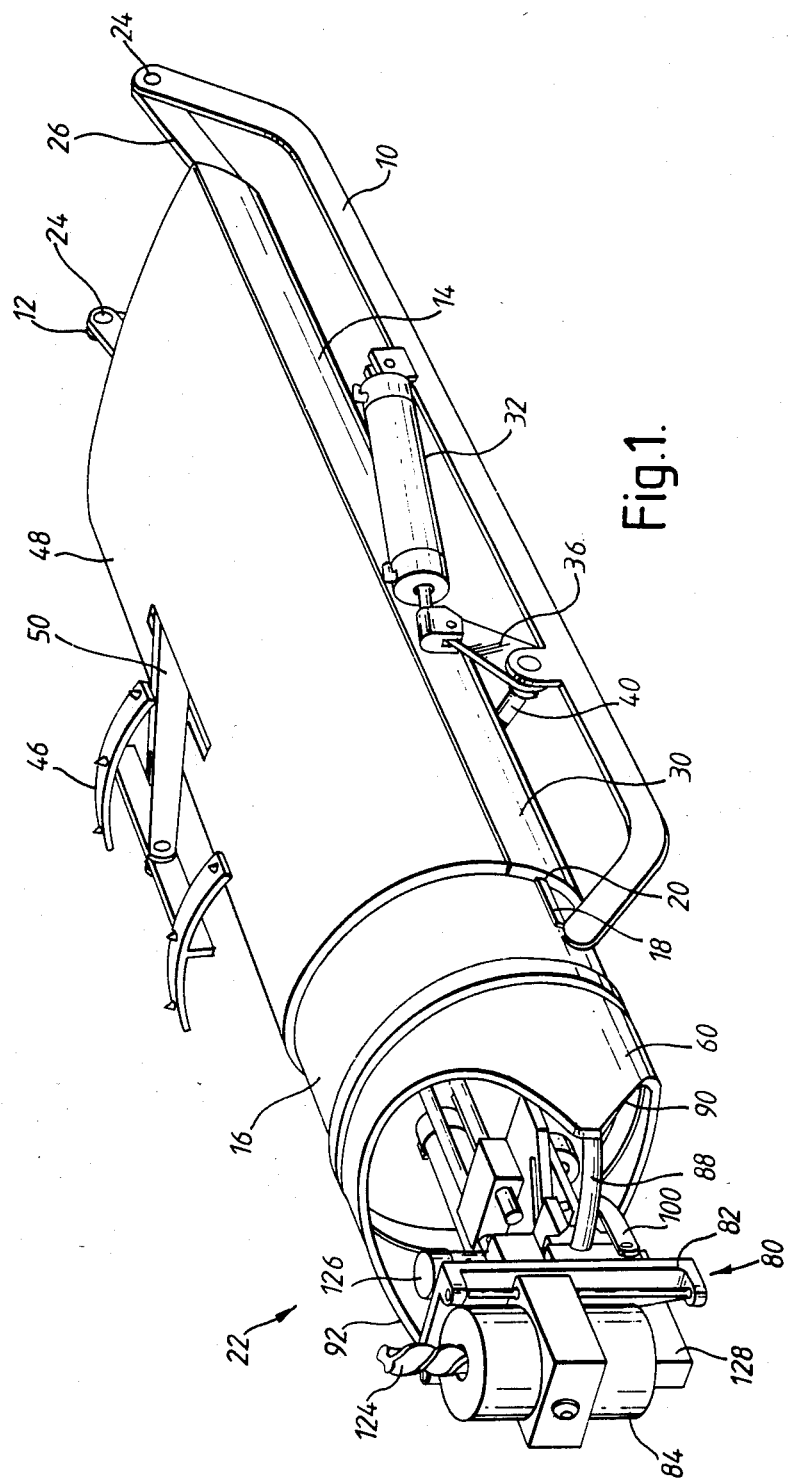
FIG. 1 is a perspective view of a remotely controllable robot in accordance with the invention.

Referring to FIG. 1, a robot in accordance with the invention has a carriage in the form of a pair of skids 10 and 12 which supports a part cylindrical tray 14. The tray 14 carries a cylindrical sleeve member 16 projecting from the front end of the tray 14. The sleeve member 16 is longitudinally movable in the tray 14, rails 18 attached to the exterior surface of the sleeve member 16 engage grooves 20 in the tray 14. Together, the tray 14 and sleeve member 16 comprise a support structure rotatably housing a tool mounting assembly 22.

Reference should be made to FIGS. 2a, 2b, 3a, 3b 4a and 4b for understanding the manner in which the carriage 10,12, the support structure 14,16, and the tool housing assembly 22 fit together and move relative to one another. As is seen in FIG. 1, the tray 16 is attached to the rear ends of the skids 10 and 12 by pivoting joints 24, a U-shaped member 26 being welded to a rear transom plate 28 on the tray 14. A front end portion 30 (FIG. 3b) is supported on an elevator mechanism comprising a pair of hydraulic elevator rams 32 and 34 pivotably mounted on the skids 10 and 12, a pair of levers 36 and 38 and an arcuate bar 40 having a lug 42 which is slidably received in a bracket 44 on the underside of the tray 14. Expansion of the rams 32 and 34 cause the levers 36 and 38 to rotate about pivot points on the skids 10 and 12, thereby rotating the arcuate bar 40 about a horizontal axis so as to raise the lug 42. This pushes up the front end portion 30 of the tray 14 together with the sleeve member 16 and the tool mounting assembly 22. Thus, the longitudinal axis of rotation of the tool mounting assembly is moved relative to the skids 10 and 12 and hence relative to the walls of the pipe in which the robot is operating. In this way, the longitudinal axis can be bought into coincidence with the central axis of pipes of various sizes.

When a required elevation of the support structure and tool mounting assembly has been reached the robot can be clamped in position by raising a clamping shoe 46 (FIG. 1) against an opposite wall of the pipe from the skids 10 and 12. This stablises the robot during pipe cutting or other operations. The clamping shoe is operated by a ram (not shown) inside the cover 48, acting via a crank connected to arm 50.

To advance or withdraw the tool mounting assembly 22 longitudinally in the pipe, the sleeve member 16 is linearly movable in the tray 14. The front half 52 of the sleeve member 16 is cylindrical, and the rear half 54 is part cylindrical (FIG. 3a). A double-acting long travel longitudinal ram 56 (FIG. 3a) is located with its body against the transom plate 28 and its piston rod against a flange 58 fixed in the bottom of the front half 52 of the sleeve member 16.

As has been mentioned before, one of the features of the preferred embodiment of the invention is that all movement functions are carried out by hydraulic rams for ease of control, for power, and for reliability in wet conditions. This feature extends to the drive mechanism for rotating the tool mounting assembly 22 in the sleeve member 16.

Figure 4A:
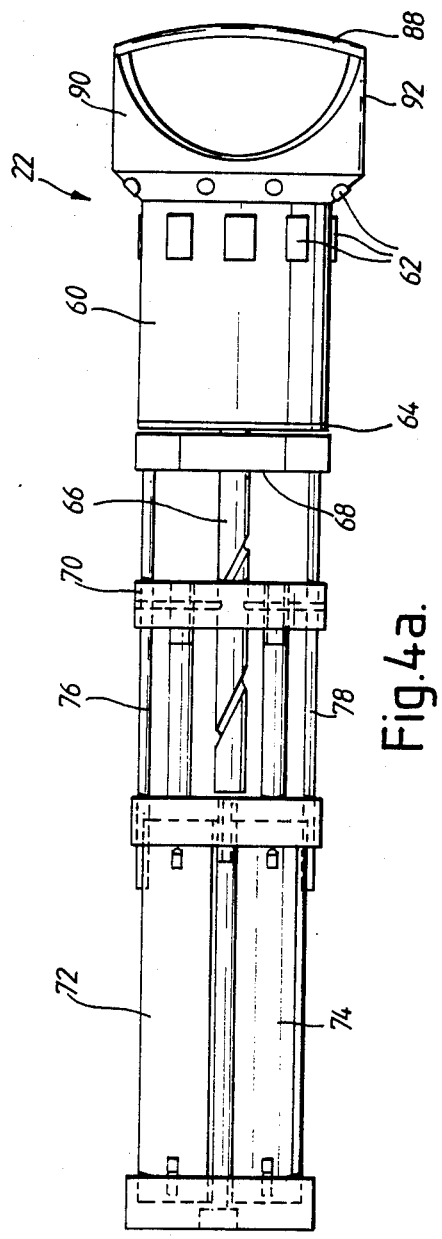
FIGS. 4a and 4b are a plan view and a side view respectively of a housing and a drive mechanism for rotating the housing inside the sleeve member of FIGS. 3a and 3b.
Figure 4B:
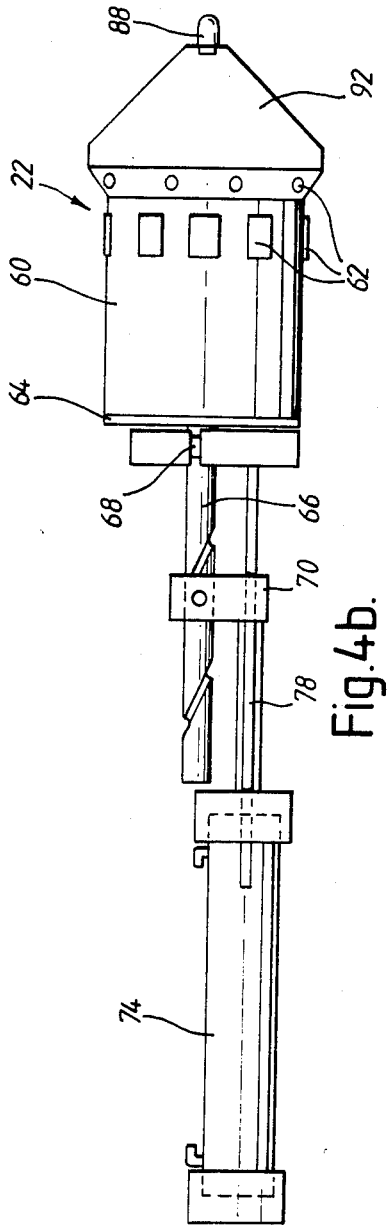

Referring to FIGS. 4a and 4b, the tool mounting assembly has a casing 60 with phosphor-bronze bearing pads 62 for engaging the inside surfaces of the sleeve member. The casing has a rear plate 64 in which is fixed a central helically grooved rod 66. This rod is also supported in a bearing 68 fixed to the sleeve member 16 (this prevents longitudinal movement of the rod) and passes through a block 70 having pins 72 which are received in the helical grooves. It will be understood that linear, longitudinal movement of the block 70, will, provided the block itself is prevented from rotating, cause the rod 66 to rotate, so rotating the tool mounting assembly 22. The block 70 is driven by a pair of double-acting rams 72 and 74 mounted in the sleeve member 16. Rails 76 and 78 prevent the block 70 from rotating.

Figure 5:
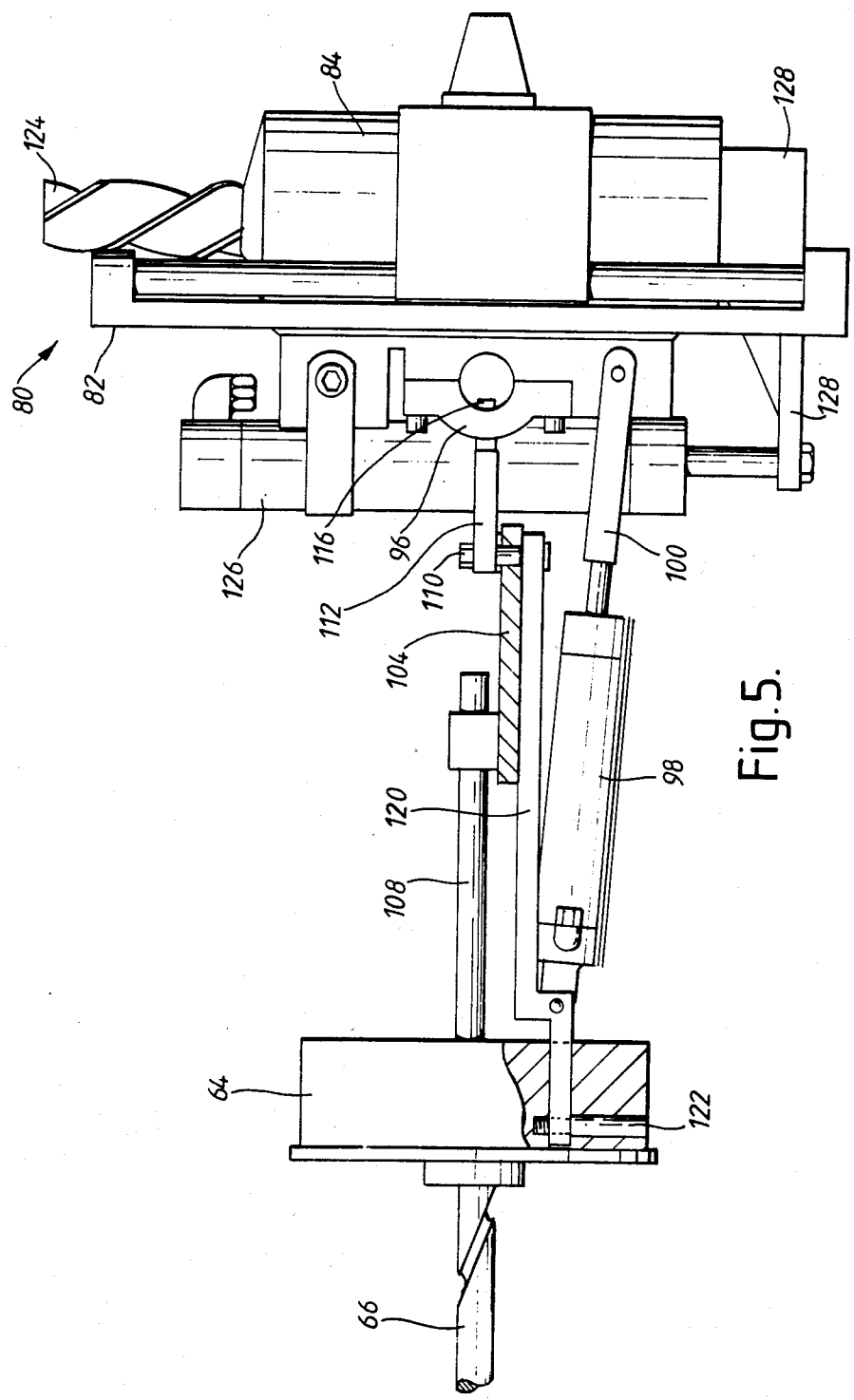
FIG. 5 is a side view of a tool mounting plate supporting a power drill together with nodding and lifting drive means.
Figure 6:
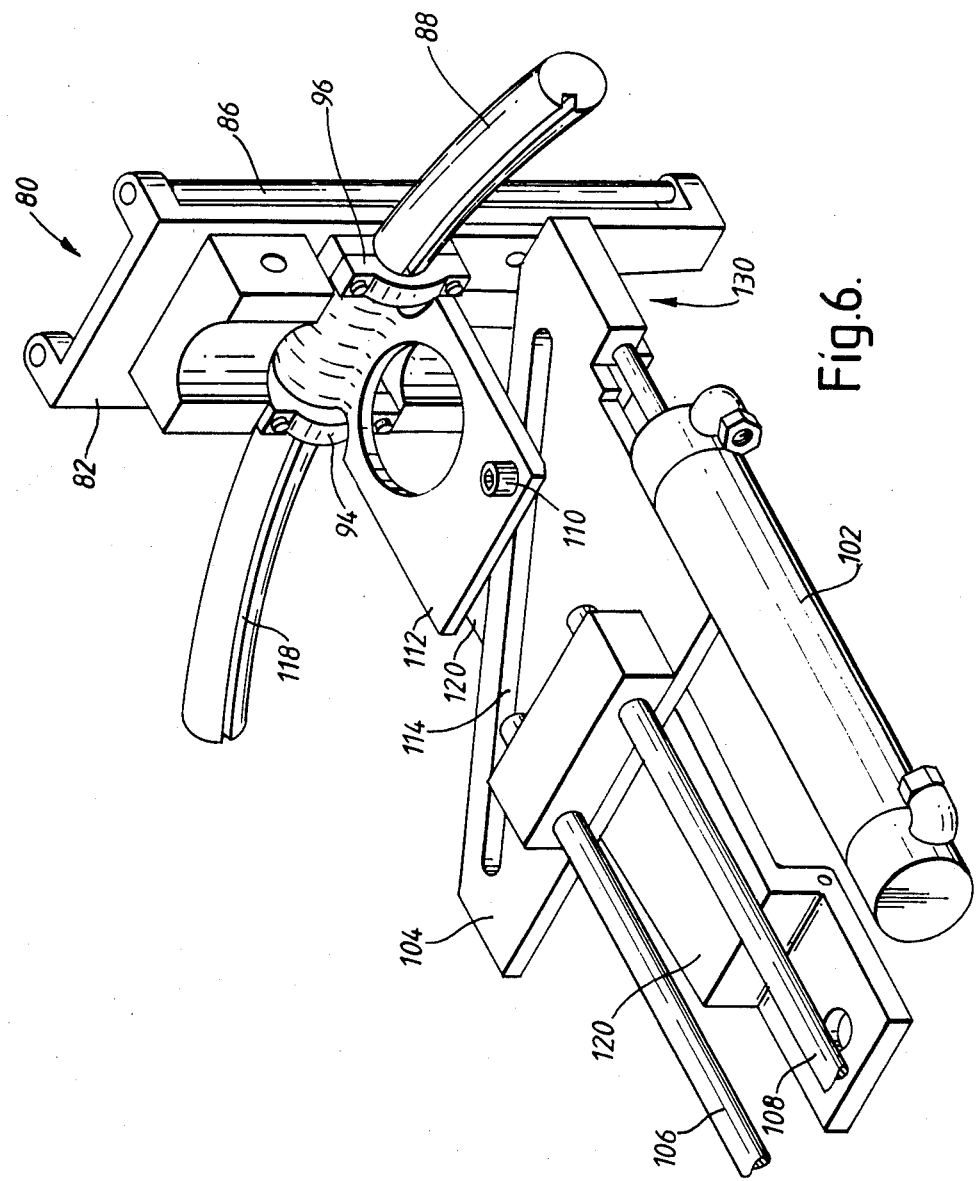
FIG. 6 is a perspective view of the tool mounting plate of FIG. 5 together with lateral drive means.

Referring now to FIGS. 1, 5 and 6, the tool mounting assembly 22 carries a tool mounting head 80 having two freedoms of movement within the casing 60 in response to actuation of two rams forming part of the tool mounting assembly 22. In this embodiment the head 80 comprises a plate 82, here shown supporting a compressed air motor 84 on a pair of slides 86. This plate 82 runs on an arcuate bar 88 spanning the space between two tongues 90 and 92 forming the front end of the casing 60.

The first freedom of movement is pivoting or 'nodding' of the plate 82 about a transverse axis defined by bearings 94 and 96 fixed to the back of the plate 82. A longitudinally mounted 'nodding' ram 98 connected at its rear end to the rear plate 64 of the casing 60 pushes or pulls the lower end of the plate 82 to tilt the plate back or forth about the bar 88 by means of a U-shaped pivoting link 100. It will be noted that nodding movement of the head 80 allows the plate 82 to remain vertical when the elevator rams 32 and 34 are operated.

The second freedom of movement is a lateral movement of the plate 82 relative to the longitudinal axis. In this case, the plate 82 moves along the arcuate bar 88 in response to actuation of a second longitudinally mounted ram 102. The longitudinal movement of the piston rod of this ram is converted into transverse movement by an inclined slot and peg arrangement comprising a plate 104 sliding on fixed bars 106 and 108 and a peg 110 mounted on a sleeve plate 112 sliding on the bar 88 between the bearings 94 and 96. Referring to FIG. 6, expansion of the ram 102 moves the plate 104 forwards, causing the peg 110 to run along an inclined slot 114 and thus move the sleeve plate 112 along the arcuate bar 88. The sleeve plate 112 has a key 116 (see FIG. 5) which engages the keyway 118 in the bar 88 to prevent it from tilting with the plate 82. Since the sleeve plate 112 is sandwiched between the bearings 94 and 96, the plate 82 also moves along the bar 88 when the ram 102 is actuated. The sleeve plate 112 is connected to an arm 120 pivoted at its rear end on a pin 122 (FIG. 5) housed in the rear plate 64 of the casing 60, the axis of the pin 122 coinciding with the centre of curvature of the arcuate bar 88.

Finally, the motor 84, shown in FIGS. 1 and 5 with a drill bit 124 attached, can be extended or retracted on the slides 86 by a vertically mounted extension ram 126 also housed in the tool mounting assembly 22. This ram is attached to the back of the plate 82 and is connected to the base of the motor 84 by a bracket 128 passing through a notch 130 in the base of the plate 82.

In the preferred embodiment, various parts are easily detached from the main body of the robot to perform different tasks. For example, the drill bit 124 can be replaced by various other cutting or abrasion tools, the motor 84 can be replaced by another device such as a grout injector. Alternatively, a camera could be mounted on the plate 82. In addition, the whole tool mounting assembly 22 can be replaced by an alternative assembly, for example a cable laying assembly. An alternative motor and drill assembly shown in FIG. 7 has cutting tool 124 specifically designed for cutting an aperture 132 in a pipe lining 134 at a branch pipe opening 136, although it should be understood that the drill bit shown in FIGS. 1 and 5 could also be used for this operation. The cutting tool 124 is a milling tool with cutting surfaces on its sides and with an enlarged distal end portion 138 in the form of a buffer rim or ring of larger diameter than the rest of the tool, which has proximal cutting surface 140. The purpose of the rings will be apparent from the description below.

One feature of the preferred embodiment is that at least one of the rams is connected to a hydraulic line including a pressure limiting device so that the lateral pressure that can be applied to the tool 124 during aperture cutting is limited to a predetermined level.

Figure 7:
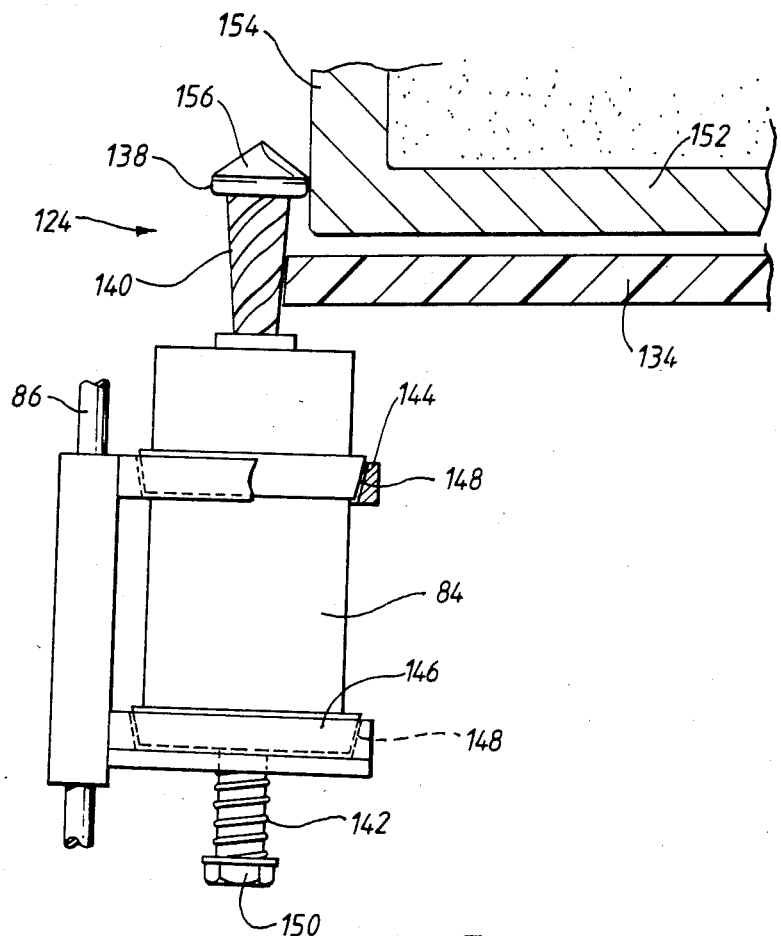
FIG. 7 is a side view of an alternative drill and mounting.

Alternatively, referring to FIG. 7, the motor 84 may be mounted on the slide 86 by means allowing the motor and tool to move towards the mounting plate 82 against the action of a spring 142 when the tool meets lateral resistance above a predetermined level. Bevelled mounting rings 144 and 146 engage bevelled surfaces 148 on the motor body so that the motor and tool move upwardly against the spring 142 when the rim 138 of the tool engages a solid surface. In the embodiment shown in FIG. 7, the tool 124 is tapered so that the cutting surface 140 moves away from the edge of the aperture when the spring 142 is compressed. Adjustment of the spring force is provided for by a bolt 150.

Figure 8:
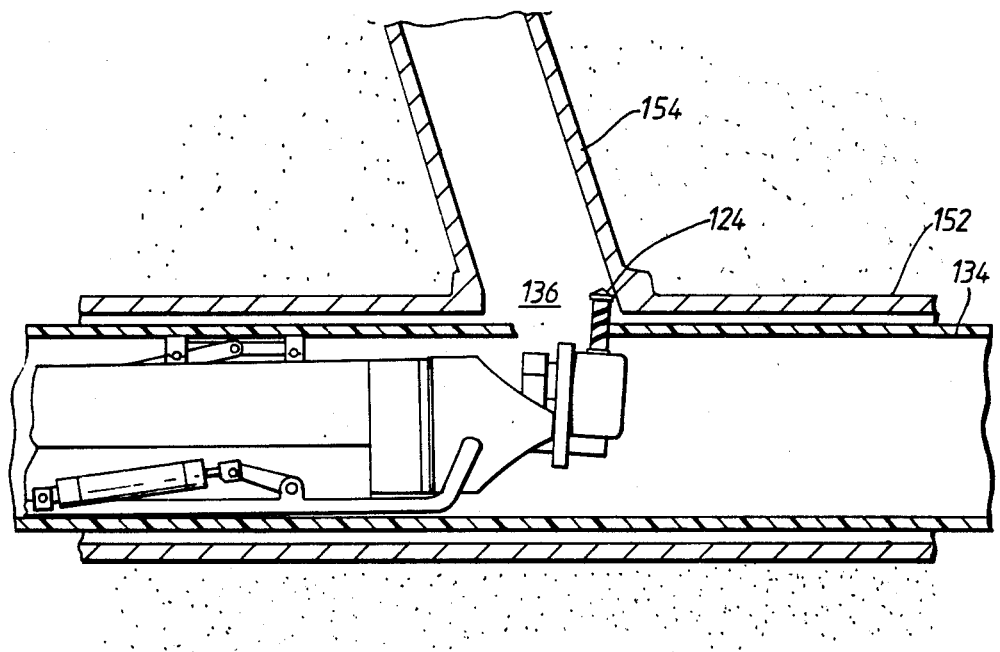
FIG. 8 is side view of a robot in accordance with the invention located in a lined underground pipe.
Figure 9:
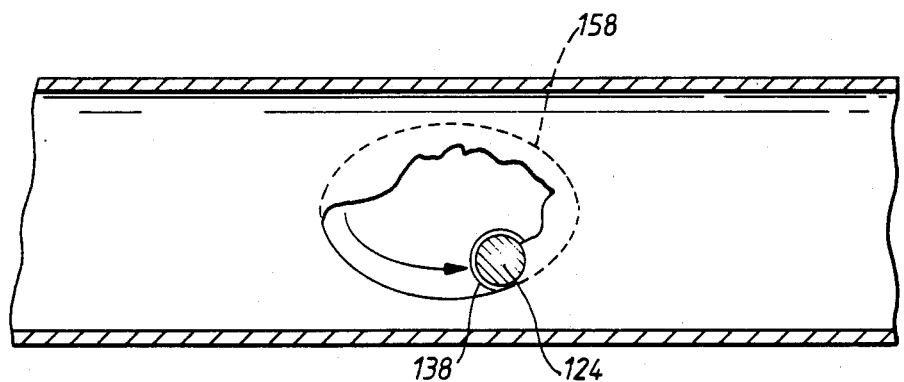
FIG. 9 is a diagrammatic underside view illustrating the cutting of an aperture in a pipe lining using the drill of FIG. 7.

Referring to FIGS. 7 and 8, which show the robot located inside a lined sewer pipe 152 adjacent a branch pipe opening 136, the pipe 152 has been slip-lined with an inner polyethylene lining 134 which must be cut away beneath the branch pipe 154. The cutting tool 124 may include an end cutting surface 156 at its distal end to make the initial hole in the polyethylene lining 134, or this may have been carried out previously using a different tool. Once the machine has been clamped against the lining 134, the main positioning rams 56 and 126 are operated to position the tool and push it through the hole in the pipe wall, following which a lateral force is exerted on the tool 86 by the rams 56 and 98 or 72, 74 and 102, depending on the direction of movement of the cutter. In this manner, an aperture is progressively opened out, the boundary 158 of the aperture being determined by the interior profile of the branch pipe 154. When the end portion 138 of the tool meets the pipe 154, further outward movement of the tool is prevented by the pressure limiting device in the hydraulic circuit or the mechanism described above. The rim 138 has a smooth edge so that the surface of the pipe 154 remains largely undamaged. When the boundary has been reached, the rams are controlled so as to follow the dotted line shown in FIG. 8 until the aperture is finished. The machine can then be moved to the next branch pipe to perform the same operation. Monitoring of the positioning and aperture cutting is performed by closed-circuit TV using a camera mounted on a separate carriage or on a lengthened sledge carrying the machine.

In some circumstances, the configuration of aperture to be cut favours the use of an alternative construction in the tool mounting assembly. The arcuate bar 88 shown in FIGS. 1 and 6 is replaced by a pair of straight, transverse bars fixed between the tongues 90 and 92 on the casing 60, so that the tool mounting head 80 moves along a linear path rather than an acruate one when driven by the ram 102.

When the aperture is cut in the inner slip-lining 134 the space between the lining 134 and the original main sewer pipe 152 is filled with grout using for example the method described in my co-pending application Ser. No. 06/337,931 now abandoned. The robot described herein can also be used to fit the grout supply valves disclosed in that application, the cutting tool and its motor being replaced by a suitable alternative tool.

I claim:

1. A remotely controllable travelling robot for operation inside a pipe or bore-hole, comprising a carriage (10, 12) for engaging the wall of the pipe or bore-hole, a support structure (14, 16) mounted on the carriage (10, 12), and a tool mounting assembly (22) carried by the support structure and rotatable relative to the support structure by remote control about a longitudinal axis, wherein the support structure (14, 16) is movable by remote control relative to the carriage (10, 12) to vary the position of the said longitudinal axis of rotation relative to the carriage, wherein said tool mounting assembly (22) is housed at a front end of the support structure (14, 16) and wherein a rear end portion of the support structure is pivotally mounted on a rear end portion of the carriage (10, 12), a front end portion of the support structure being supported on the carriage by an elevator mechanism (32-40) for elevating the tool mounting assembly (22), and so varying the position of the said longitudinal axis of rotation relative to the carriage (10, 12).

2. A robot according to claim 1, wherein the elevator mechanism (32-40) includes an elevator ram (32-34) having one end mounted on the carriage (10, 12) and its other end connected to a lever (36-38) pivotally mounted on the carriage.

3. A remotely controllable travelling robot for operation inside a pipe or bore-hole, comprising a carriage (10, 12) for engaging the wall of the pipe or bore-hole, a support structure (14, 16) mounted on the carriage (10, 12), and a tool mounting assembly (22) carried by the support structure and rotatable relative to the support structure by remote control about a longitudinal axis, wherein the support structure (14, 16) is movable by remote control relative to the carriage (10, 12) to vary the position of the said longitudinal axis of rotation relative to the carriage, wherein said support structure comprises a part cylindrical tray (14) mounted on the carriage (10, 12), and a cylindrical sleeve member (16) longitudinally movable in the tray (14), and wherein the tool mounting assembly (22) has a cylindrical casing (60) rotatable in the sleeve member (16) and projecting from a forward end thereof.

4. A robot according to claim 3, wherein the casing (60) has two forwardly projecting tongues (90, 92) which support a transverse bar (88) the bar slidably mounting a tool mounting head (80) for transverse movement of the head relative to the longitudinal axis.

5. A robot according to claim 4, wherein the head (80) includes a slide (86) for moving a tool (84, 124) mounted thereon in a direction perpendicular to the transverse bar (88).

6. A remotely controllable robot for use in a pipe or bore-hole, comprising a carriage (10, 12) for engaging the wall of the pipe and allowing longitudinal movement of the robot along the pipe or bore-hole, a support structure (14, 16) mounted on the carriage (10, 12), a tool mounting assembly (22) carried by the support structure, and drive means for rotating the tool mounting assembly (22), relative to the support structure (14, 16) by remote control about a longitudinal axis, the drive means comprising a first member in the form of a rod (66) mounted on the longitudinal axis and having a helix cut in its exterior surface, a second member in the form of a block (70) located on the rod (66) and engaging the helix, and a rotation ram (72, 74) for producing relative linear movement between the first and second members, one of the members being mounted in the tool mounting assembly (22) and the other of the members being mounted in the support structure (14, 16) so that operation of the ram (72, 74) produces rotational movement of the tool mounting assembly (22) relative to the support structure (14, 16).

7. A remotely controlled machine for cutting an aperture (158) in an internal pipe lining (134) comprising a carriage (10, 12), a support structure (14, 16) mounted on the carriage, a tool mounting head (80) supported in the support structure (14, 16) and rotatable about a longitudinal axis, and a motor (94) attached to the tool mounting head (80), wherein the motor (84) carries a cutting tool having a distal end portion (138) of a first diameter for engaging the interior wall of a branch pipe (154) and a laterally directed inset cutting surface (140) located proximally of the distal end portion (138) for cutting an aperture (158) in the lining (134) in registry with the branch pipe (154), the outermost part of the cutting surface defining a second diameter which is less than said first diameter, and wherein the motor (84) and tool (124) are movable towards or away from the pipe lining (134) and longitudinally relative to the carriage (10, 12).

8. A method of cutting an aperture in an internal pipe lining at a branch pipe opening using a machine comprising a carriage (10, 12), a support structure (14, 16) mounted on the carriage, a tool mounting head (80) supported in the support structure (14, 16) and rotatable about a longitudinal axis, and a motor (94) attached to the tool mounting head (80), wherein the motor (84) carries a cutting tool having a distal end portion of a first diameter (138) for engaging the interior wall of a branch pipe (154) and a laterally directed inset cutting surface (140) located proximally of the distal end portion (138) for cutting an aperture (158) in the lining (134) in registry with the branch pipe (154) and wherein the motor (84) and tool (124) are movable towards or away from the pipe lining (134) and longitudinally relative to the carriage (10, 12), the method comprising positioning the cutting tool in registry with the branch pipe opening, advancing the tool towards and through the lining moving the tool transversely to the branch pipe axis until the distal end portion engages the interior surface of the branch pipe, and advancing the tool circumferentially around the opening to cut an aperture in the lining with the laterally directed cutting surface of the tool, the interior surface of the branch pipe being used as a template so that the aperture is cut in registry with the edge of the branch pipe opening, the outermost part of the cutting surface defining a second diameter which is less than said first diameter.

* * * * *